United States Patent
Harper et al.

[11] 3,818,290
[45] June 18, 1974

[54] POSITION COMPENSATOR FOR A PROGRAMMED WORK DEVICE

[75] Inventors: Ernest V. Harper, Utica; Richard W. Yasenchak, Farmington, both of Mich.

[73] Assignee: General Motors Corporation, Detroit, Mich.

[22] Filed: Jan. 18, 1973

[21] Appl. No.: 324,793

Related U.S. Application Data

[63] Continuation of Ser. No. 132,063, April 7, 1971, abandoned.

[52] U.S. Cl. .................................. 318/39, 318/571
[51] Int. Cl. ............................................ G05b 19/24
[58] Field of Search ............................... 318/39, 571

[56] References Cited
UNITED STATES PATENTS

| | | | |
|---|---|---|---|
| 2,937,365 | 5/1960 | Peaslee | 318/39 X |
| 3,267,344 | 8/1966 | McDaniel | 318/39 |
| 3,283,918 | 11/1966 | Devol | 318/39 X |
| 3,327,499 | 6/1967 | Schmidt et al. | 318/39 X |
| 3,372,568 | 3/1968 | Lemelson | 318/39 X |

*Primary Examiner*—T. E. Lynch
*Attorney, Agent, or Firm*—Edward J. Biskup

[57] ABSTRACT

A position compensator for a program controlled work tool which is movable along a path in a work station for compensating for the movement of a workpiece through the work station so that the work tool may perform preprogrammed operations at prescribed locations on the workpiece independent of the movement of the workpiece through the work station. The position compensator includes a tracking member mounted on a track adjacent the work station. The tracking member includes a lock lever which is actuated to engage a gate lock on the workpiece carrier as it enters the work station. The tracking member is thereafter moved down the track by the gate lock as the workpiece carrier moves through the work station. A first encoder is positioned by the movement of the tracking member so as to generate a signal which is directly related to the position of the workpiece carrier in the work station. A second encoder is positioned by the movement of the work tool along the path in the work station so as to generate a signal which is directly related to the position thereof along the path. These two signals are received by a difference detector which generates and supplies to a programmed controller a signal which represents the position of the work tool with respect to the workpiece. This signal enables the programmed controller to position the work tool along the path so that the work tool may perform preprogrammed operations at predetermined locations on the workpiece as if the workpiece were in a stationary and precisely fixed position.

7 Claims, 7 Drawing Figures

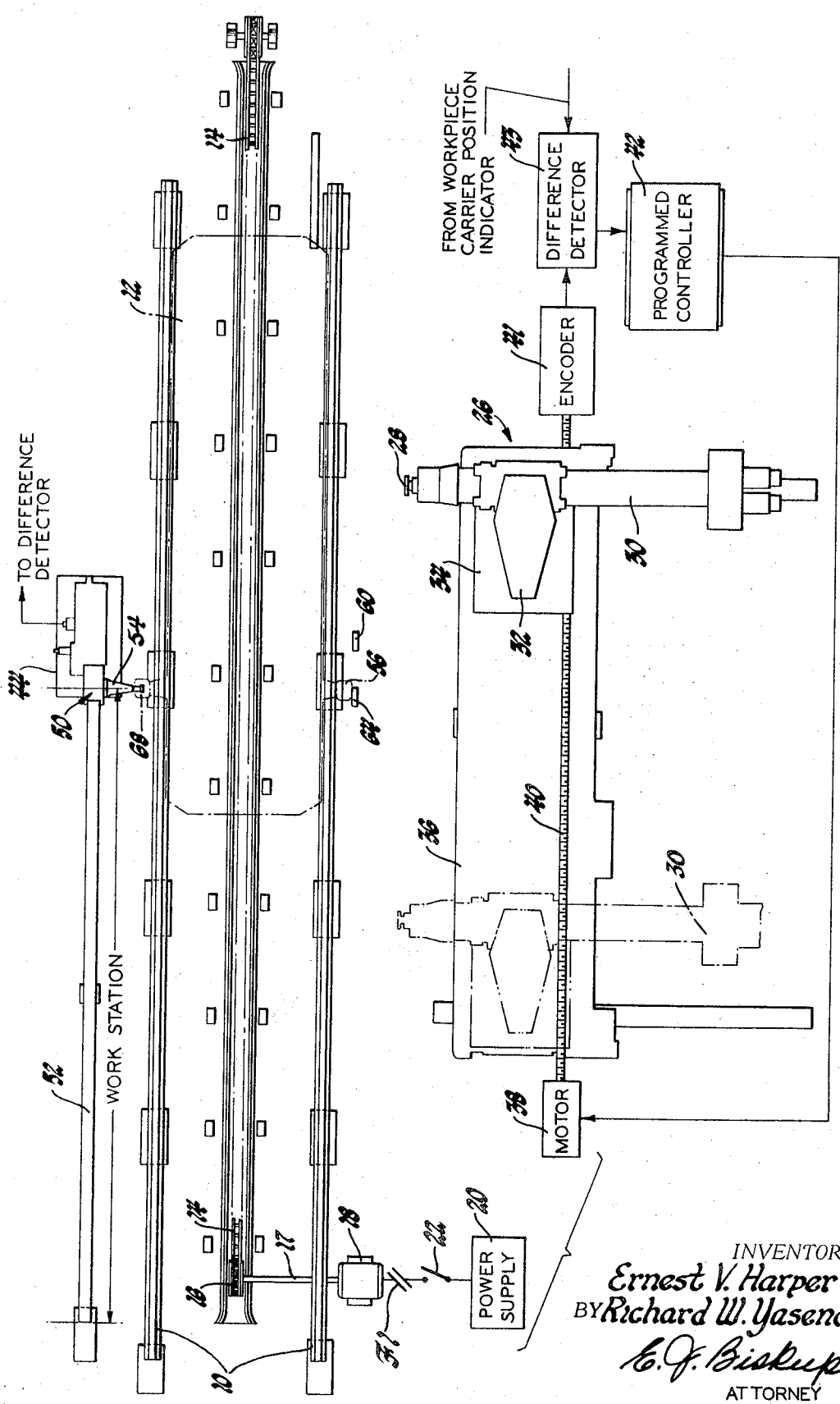

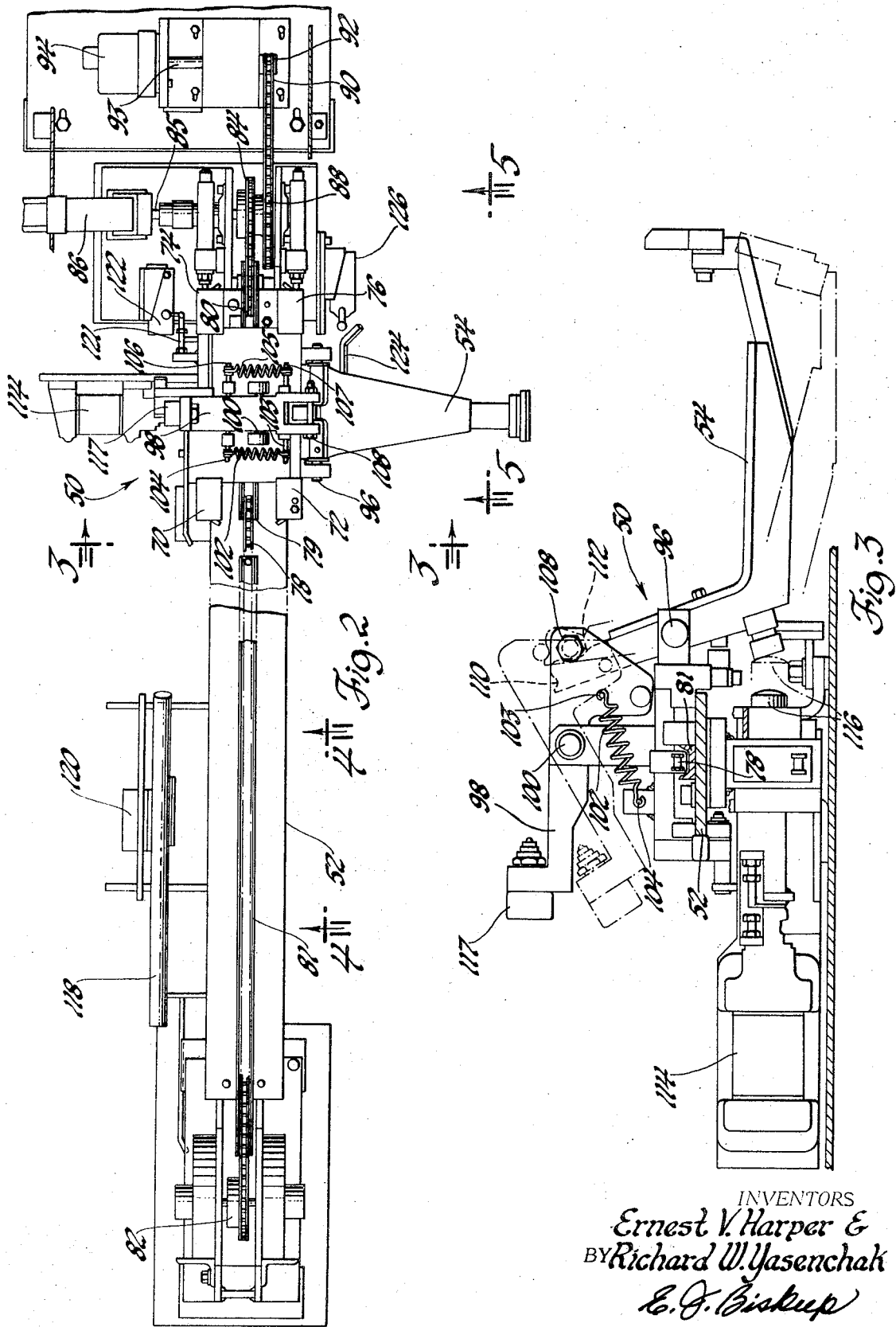

INVENTORS
Ernest V. Harper &
BY Richard W. Yasenchak

E.J.Biskup
ATTORNEY

POSITION COMPENSATOR FOR A PROGRAMMED WORK DEVICE

This is a Continuation of Ser. No. 132,063 filed Apr. 7, 1971, now abandoned.

This invention relates to an apparatus for performing programmed operations on a workpiece mounted on a carrier movable along a predetermined path. More specifically, this invention relates to a position compensator for a programmed work tool which is movable along a path adjacent to the path of movement of a workpiece for enabling the work tool to perform programmed operations on any portion of the moving workpiece as if the latter were stationary.

A programmed controlled work tool which is movable along a path adjacent an article may be programmed to perform prescribed operations at specific locations on the workpiece if the position of the work tool relative to the workpiece is precisely known. When the workpiece is positioned at a predetermined location relative to the work tool, a programmed controller can position the work tool along a path adjacent thereto so as to perform the prescribed operations on the workpiece simply by monitoring the position of the work tool along the path. This system, may repeat the programmed operations on successive workpieces as long as they are moved to the prescribed location and remain stationary. If movement were to be imparted to the workpiece along a path adjacent to the work tool, it can be seen that the foregoing system would be incapable of performing the desired operations on the precise fixed locations on the workpiece without taking into consideration the changing position of the workpiece. It is, therefore, the general object of this invention to provide a position compensator for a program controller work tool movable along a path for enabling the work tool to perform programmed operations on a workpiece moving along a path parallel to the path of the work tool.

It is another object of this invention to provide a position compensator which generates a signal representing the position of a workpiece along a first path adjacent to a programmed work tool which is movable along a second path parallel to the first path and combines this signal with a signal representing the position of the work tool to generate a signal representing the position of the work tool relative to the workpiece so that the programmed work tool may perform programmed operations on the workpiece as if the workpiece were in a stationary and precisely fixed location.

It is another object of this invention to provide for a position compensator which is automatic in operation and which provides a signal representing the position of each of a number of successive workpieces as it is moved along a path adjacent a program controlled work tool.

These objects are accomplished by means of a position compensator which includes a tracking member that is coupled to a moving carrier of a workpiece as the latter enters a work station. The tracking member is thereafter driven by the workpiece carrier as it travels through the work station. As the tracking member is moved, an encoder is positioned thereby to generate a signal which represents the position of the workpiece carrier within the work station. A signal representing the position of a programmed controlled work tool adjacent the path of movement of the workpiece within the work station and the signal representing the position of the workpiece carrier are used by a difference detector to generate a signal which represents the position of the work tool relative to the workpiece carrier. A programmed controller receives the output of the difference detector which output enables the controller to control the position of the work tool with respect to the workpiece as if the workpiece were stationary at a precisely fixed location.

The invention may be best understood by reference to the following description of a preferred embodiment and the drawings in which:

FIG. 1 is a schematic drawing of the general layout of a work station which includes the position compensator of the present invention, the workpiece carrier and the program controlled work tool;

FIG. 2 is an enlarged plan view of a workpiece carrier position indicator which forms a part of FIG. 1;

FIG. 3 is an enlarged elevation view of the tracking member portion of the position indicator and shows the lock lever and controls therefor taken along the lines 3—3 of FIG. 2;

Figure 4:
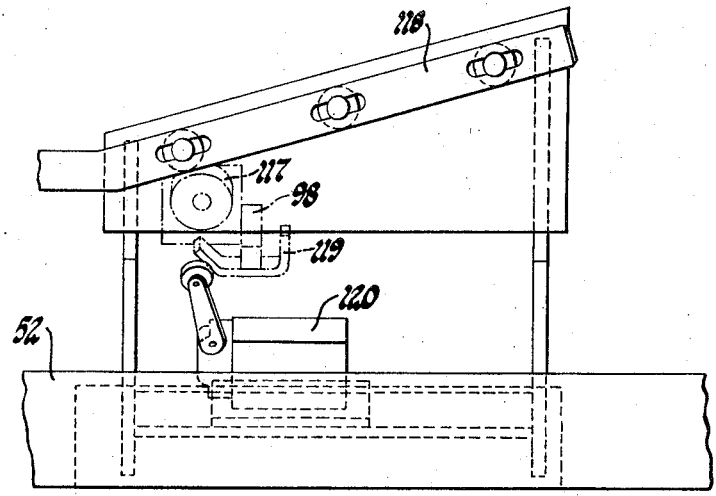
FIG. 4 is an enlarged view taken along the lines 4—4 of FIG. 2 of the disengaging cam for the lock lever of FIG. 3.

Referring to FIG. 1, there is shown a portion of a conveyor line which traverses a work station within which prescribed operations are to be performed on a workpiece. The conveyor line includes a pair of tracks 10 upon which is mounted a workpiece carrier 12. A drive chain 14 is attached to the workpiece carrier 12 and engages a sprocket 16 which is connected to the output shaft 17 of a motor 18. The chain 17 and the motor 18 are effective to move the workpiece carrier 12 along the tracks 10 when the motor 18 is energized by a power supply 20 through a manually operable contact 22 and a set of normally open relay contacts F1.

A programmed controlled work tool 26 is mounted adjacent the tracks 10 within the work station for performing prescribed operations on a workpiece (not shown) which is carried by the workpiece carrier 12. The program controlled work tool 26 includes a work head 28 mounted on one end of a boom 30 which in turn is mounted for vertical and horizontal movements on a vertical member 32. The vertical member 32 is attached to a base member 34. The base member 34 is mounted for horizontal movement along a supporting structure 36 and is moved therealong by means of a motor 38 and a screw 40 the latter of which can be considered to be a guide track for the base member. As can be seen, the work head 28 can be moved to any desired position along the tracks 10 for performing operations on a workpiece by energizing the motor 38 and rotating the screw 40. The screw 40 is connected to the input shaft of an encoder 41 which is rotated thereby when the motor 38 is energized. The output of the encoder 41 is a signal which is directly related to the position of the base member 34 on the structure 36.

The work head 28 is moved through a sequence of motions so as to perform operations on a workpiece within the work station by means of a programmed controller 42. The program controlled work tool 26 and the programmed controller 42 are of the well known variety in which the system is taught a sequence of operations by first manually moving the work head 28 through the desired sequence of motions and operations, the movements of which are memorized by recording the position of the work head 28 at a series of points along the desired path of movement. Only the actuator and encoder for the base member 34 is shown, but it is understood that similar devices are provided for each degree of movement. During operation, the programmed controller 42 compares the outputs of the encoders with the memorized desired outputs and drives the actuators for each degree of freedom until the actual position of the work head 28 equals the desired position. By reproducing in this manner each of the series of points memorized, the desired motion of the work tool 26 is reproduced. This form of program controlled device and controller therefore are well known and consequently will not be described in further detail.

Where the workpiece upon which programmed operations are to be performed is precisely located within the work station, it is only necessary to feed back to the programmed controller 42 the absolute position of each of the movable elements of the program controller work tool 26 and the position of the base member 34 on the supporting structure 36. But, where the workpiece is being moved along the conveyor line through the work station, it is insufficient merely to supply the absolute position of the base member 34 on the support structure 36 as represented by the output of the encoder 41, since the position of the workpiece is not constant. Therefore, in the case of a workpiece which is moving through the work station and whose movement may vary therein, it is necessary to compensate for the variations of the positions of the workpiece as it is moving through the work station in order for the program controlled work tool 26 to perform prescribed programmed operations at fixed locations on the workpiece. This is accomplished by supplying the output of the encoder 41 to a difference detector 43 which also receives an input from a workpiece carrier position indicator 44, which input is a signal representing position of the workpiece carrier 12 in the work station. The difference detector subtracts the position of the workpiece carrier 12, as represented by the input signal from the workpiece position indicator 44, from the position of the base member 34 on the support structure 36, as represented by the output of the encoder 41, and supplies to the programmed controller 42 a signal representing the difference, which difference is directly proportional to the absolute distance between the position of the base member 34 on the support structure 36 and the position of the workpiece carrier 12 within the work station. As the workpiece is precisely fixed on the workpiece carrier 12 and the work tool 26 is moved with the base member 34, the signal input to the programmed controller 42 also represents the position of the work tool 26 relative to the workpiece carried by the workpiece carrier 12. In this manner, the programmed controller 42 and the work tool 26 may be taught to perform operations on specific areas of a workpiece and thereafter perform those operations on a moving workpiece as if the workpiece were stationary. The velocity of the work tool 26, when moved between the memorized points along the support 36 by the motor 38 and the screw 40 during programmed operation, is independent from and substantially greater than the velocity of the workpiece carrier 12.

The difference detector 43 may be any one of several known designs which performs the mathematical function of subtracting two inputs and generates a signal representing the difference.

The workpiece carrier position indicator 44 includes a tracking member 50 which is mounted on a track 52 for movement therealong through the work station. The tracking member 50 includes a lock lever 54 having raised and lowered positions. As the workpiece carrier 12 is moved into the work station by the chain 14, a U-shaped gate lock 56, which is attached to the workpiece carrier 12, first engages a limit switch 60. Upon further movement of the article carrier 12, the gate lock 56 releases the limit switch 60 and engages a limit switch 64. The limit switch 64 is positioned relative to the gate lock 56 and a second transversely aligned U-shaped gate lock 68 which is also attached to the workpiece carrier 12 such that the arms of the gate lock 68 are centered over the lock lever 54 when the limit switch 64 is actuated by the gate lock 56. Upon the actuation of the limit switch 64, the lock lever 54 is raised and locked into a position between the arms of the U-shaped gate lock 68. Thereafter, further movement of the article carrier 12 carries the lock lever 54 and accordingly the tracking member 50 along the track 52. Movement of the tracking member 50 positions an encoder on the workpiece carrier position indicator 44 which supplies a signal to the difference detector 43 representing the position of the workpiece carrier 12 within the work station.

At the exit point of the work station, the lock lever 54 is moved to its lowered position to release the tracking member 50 from the workpiece carrier 12. The tracking member 50 is then returned to its original position. When a subsequent workpiece carrier 12 enters into the work station the lock lever 54 will again be raised between the arms of the U-shaped gate lock 68 and be carried down the track 52 so as to generate and supply to the difference detector 43 a signal which represents the position of the subsequent workpiece carrier 12 within the work station.

The workpiece carrier position indicator 44 also includes a control circuit which, in addition to other functions to be described, controls the set of normally open relay contacts F1 to control the energization of the motor 18. If, upon the actuation of the limit switch 60 by the gate lock 56, the tracking member 50 is not in its starting or home position as shown in FIG. 1 and the lock lever 54 is not in its lowered position, the set of normally open contacts F1 will be opened to stop the advancement of the workpiece carrier 12 until such time that the tracking member 50 is returned home and the lock lever 54 is positioned in its lowered position.

The workpiece carrier position indicator 44 and the difference detector 43 form the position compensator of the present invention.

Referring to FIG. 2, there is shown the workpiece carrier position indictor 44 of FIG. 1. The tracking member 50 is mounted on the track 52 by means of guide rollers rotatably supported in roller housings 70, 72, 74 and 76. The opposite ends of a chain 78 are attached at points 79 and 80 to the tracking member 50.

The chain 78 is adapted to move in a channel 81 and is entrained about a sprocket 82 located at one end of the track 52 and a sprocket 84 at the other end of the track 52. The sprocket 84 is secured to the drive shaft 85 of an air motor 86 and to a sprocket 88 for rotation therewith. An endless chain 90 connects the sprocket 88 with a sprocket 92 that drives an input shaft 93 of an encoder 94. As the tracking member 50 is moved down the track 52, the sprockets 84 and 88 are rotated. Rotation of the sprocket 88 causes rotation of the sprocket 92 which in turn drives input shaft 93 of the encoder 94 whose output is a signal which is proportional to the distance which the tracking member 50 is moved down the track 52. The encoder 94 may be any of a number of known position encoders such as, for example, a resolver.

The air input to the air motor 86 is controlled by a two position valve (not shown) operated by a pair of solenoid coils. When the first coil is energized the valve is moved to admit pressurized air from a source (not shown) to the air motor 86. The air motor 86 is thereby energized to rotate the sprocket 84 in a direction to return the chain 78 and the tracking member 50 to the home position as shown in FIG. 2. When the second coil is energized, the valve is moved to shut off the air supply and deenergize the air motor 86. This valve is of a well known variety and will not be described in greater detail.

The tracking member 50 includes the lock lever 54 previously described with reference to FIG. 1, the operation of which may be best understood by reference to FIGS. 2 and 3. The lock lever 54 is pivotably secured to the tracking member 50 by means of a horizontally extending shaft 96. The tracking member 50 also includes a holding lever 98 for the lock lever 54. The holding lever 98 is pivotally supported on the tracking member 50 by means of a horizontally extending shaft 100. A spring 102 has one end thereof secured to a pin 103 on the holding lever 98 while the other end is fixed to a pin 104 on the base portion of the tracking member 50. A second spring 105 is secured at one end to a pin 106 on the holding lever 98 while the other end of the spring is connected to a pin 107 on the aforementioned base portion. The springs 102 and 105 are under tension so as to bias the holding lever 98 in a clockwise direction about shaft 100 as seen in FIG. 3.

One end of the holding lever 98 is formed with a pair of spaced legs between which is a detent member that takes the form of a bolt 108, the shank portion of which is adapted to alternately engage a detent channel 110 and a detent channel 112 formed on the lock lever 54. The bolt or detent 108 and the detent channels 110 and 112 provide for two distinct positions of the lock lever 54 and the holding lever 98. These positions are represented by the solid line position and the broken line positions in FIG. 3. Assuming the lock lever 54 is initially in the lowered position represented by the broken line position, the detent 108 engages the detent channel 110 and is held therein by the tension of the springs 102 and 105. During such time, the lock lever 54 is held in the lowered position. If the lock lever 54 is thereafter moved in a counterclockwise direction about shaft 96, the detent 108 is forced out of the detent channel 110 and the springs 102 and 105 cause the holding lever 98 to be rotated clockwise about the shaft 100 until the detent 108 engages the detent channel 112. The holding lever 54 is thereafter maintained in the upward position by the force of the springs 102 and 105. When the lock lever 54 is in the raised position, it may be returned to its lower position by physically rotating the holding lever 98 in a counterclockwise direction to cause the detent 108 to move out of the detent channel 112 and permit the lock lever 54 to drop by gravity until the detent 108 engages the detent channel 110.

In order to move the lock lever 54 from its lowered position to the raised position, an air cylinder 114 is provided on the tracking member 50 which, when supplied with air under pressure, causes a plunger 116 to be advanced to the broken line position against a lower part of the lock lever 54. The plunger 116 shifts the lock lever 54 counterclockwise about shaft 96 thereby causing detent 108 to move from the detent channel 100 to the detent channel 112. The cutoff of the air pressure to the air cylinder 114 allows the plunger 116 to return to its initial full line position by virtue of an internal return spring, not shown. As previously described, the lock lever 54 is maintained in the raised position by the tension force of the springs 102 and 105. The air input to the air cylinder 114 is controlled by a solenoid operated air valve (not shown) of the well known variety in which air is admitted from a source to the air cylinder during the time period that the solenoid is energized.

The lock lever 54 is automatically moved from the raised position to its lowered position when the tracking member 50 approaches the end of the track 52. In this regard, it will be noted that a cam follower 117 is secured to the free end of the holding lever 98 and is adapted to engage cam 118 positioned in the path of travel of the cam follower as the tracking member approaches the end of the track 52. More specifically and as seen in FIGS. 2 and 4, the cam 118 is mounted adjacent to the track 52 and has an inclined lower surface which cooperates with the cam follower 117 to lower the attached holding lever 98 as the tracking member is moved past the cam 118. As can be seen with reference to FIG. 3, as the cam follower 117 moves along the cam, the holding lever 98 is rotated counterclockwise to the broken line position to force the detent 108 out of the detent channel 112 and permits the lock lever 54 to return to its lowered position as previously described. Also, as seen in FIG. 4, when the holding lever 98 is lowered by the cam 118, an acutating member 119, which is secured to the holding lever 98, actuates a limit switch 120.

Referring to FIG. 2, when the tracking member 50 is at its home position, a bolt 121 which is secured to the tracking member 50 engages the actuating arm of a limit switch 122 which is actuated thereby. In addition, when the tracking member 50 is in its home position, an actuating member 124, which is securely attached to the lock lever 54 engages the actuating arm of a limit switch 126 to actuate the limit switch when the lock lever 54 is in its lowered position.

Figure 5:
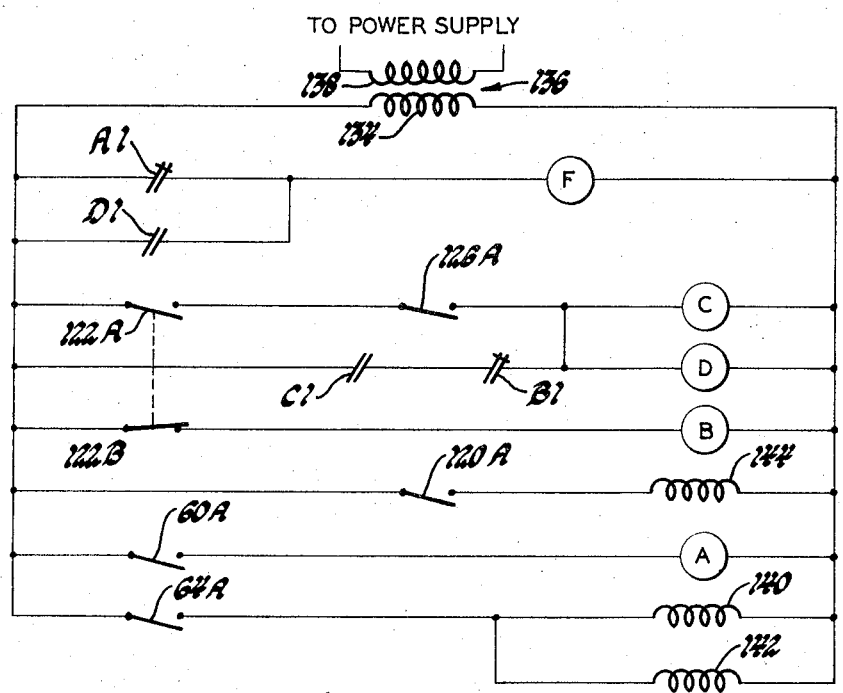
FIG. 5 is a schematic drawing of the control circuit for the workpiece carrier position indicator.

Referring to FIG. 5, there is shown the control circuit for the workpiece carrier position indicator 44 of FIG. 1. The control circuit receives operating power from the secondary winding 134 of a transformer 136 whose primary winding 138 is connected across a suitable AC power supply. A set of normally open contacts 60A of the limit switch 60 is connected in series with a relay coil A across the secondary winding 124. The relay coil A is operative when energized to open a set of normally closed relay contacts A1. A set of normally open contacts 64A of the limit switch 64 is connected in series with the parallel combination of a solenoid coil 140 and a solenoid coil 142 across the secondary winding 134. The solenoid coil 140 is operative when energized to open the solenoid operated valve in the air supply line to the air cylinder 114 of FIG. 3 as previously described to advance the plunger 116. The solenoid coil 142 is one of the two coils previously referred to with reference to the energization of the air motor 86 of FIG. 2 and is operative when energized to shut off the air supply to the air motor 86. A set of normally open contacts 120A of the limit switch 120 is connected in series with a solenoid coil 144 across the secondary winding 134. The solenoid coil 144 is the remaining coil previously referred to with reference to the energization of the air motor 86 of FIG. 2 and is operative when energized to open the air supply valve to the air motor 86. A set of normally closed contacts 122B of the limit switch 122 is connected in series with a relay coil B across the secondary winding 134. The relay coil B is operative when energized to open the set of normally closed relay contacts B1. A set of normally open contacts 122A of the limit switch 122 and a set of normally open contacts 126A of the limit switch 126 are connected in series with the parallel combination of a relay coil C and a relay coil D across the secondary winding 134. The relay coil C is operative when energized to close a set of normally open relay contacts C1 and the relay D is operative when energized to close a set of normally open relay contacts D1. The set of normally open relay contacts C1 and the set of normally closed relay contacts B1 are connected in series with the parallel combination of the relay coils C and D. The parallel combination of the set of normally closed relay contacts A1 and the set of normally open relay contacts D1 is connected in series with a relay coil F across the secondary winding 134. The relay coil F is operative when energized to close the set of normally open relay contacts F1 in FIG. 1.

The operation of the system will now be described with reference to FIGS. 1 through 5. Prior to the entry of the workpiece carrier 12 into the work station, the tracking member 50 is in its home position as shown in FIG. 2, and the lock lever 54 is in its lowered position. Consequently, the limit switches 122 and 126 are actuated to close the sets of normally open relay contacts 122A and 126A and to open the set of normally closed contacts 122B. The relay coils C and D are thereby energized to close the set of normally open relay contacts C1 and the set of normally open relay contacts D1. The closure of the normally open relay contacts C1 latches the relay coils C and D energized through the set of normally closed relay contacts B1. It will be noted, that the relay coil F is energized through the set of normally closed relay contacts A1 to close the set of normally open relay contacts F1 in FIG. 1 to maintain the motor 18 energized.

As the workpiece carrier 12 approaches the work station, the gate lock 56 actuates the limit switch 60. Upon the closure of the set of normally open contacts 60A, the relay coil A is energized to open the set of normally closed relay contacts A1. If, at this time, the tracking member 50 is not in its home position and the lock lever 54 is not in its downward position, the relay coil F will be deenergized to open the set of normally open relay contacts F1 in FIG. 1 to deenergize the motor 18 and stop the conveyor line. As previously indicated, the set of normally open relay contacts D1 will be closed when the tracking member 50 is home and the lock lever 54 is in its lowered position to maintain the relay coil F energized to maintain the conveyor line running when the relay coil A is energized. If this condition exists, the workpiece carrier 12 will continue to be moved and will enter the work station, at which time the gate lock 56 actuates the limit switch 64. Upon the actuation of the limit switch 64, the set of normally open contacts 64A are closed to energize the solenoid windings 140 and 142. The energization of the solenoid winding 140 opens the solenoid operated air valve to admit air into the air cylinder 114 to advance the plunger 116 and raise the lock lever 54 into its raised position between the arms of the U-shaped gate lock 68. Simultaneously, the energization of the solenoid winding 142 moves the air valve controlling the air input to the air motor 86 of FIG. 2 to shut off the air supply and deenergize the air motor 86. Thereafter, the tracking member 50 is moved by the workpiece carrier 12 as it moves through the work station. As previously described, the movement of the tracking member 50 down the track 52 causes the rotation of the input shaft 93 of the encoder 94 of FIG. 2 which supplies a signal to the difference detector 43 of FIG. 1 which represents the position of the workpiece carrier in the work station.

Upon movement of the tracking member 50 from its home position, and the movement of the lock lever to its upward position, the normally open contacts 60A, 122A and 126A of the respective limit switches 60, 122 and 126 open and the normally closed contacts 122B of the limit switch 122 is closed. Closure of the normally closed contacts 122B energizes the relay coil B to open the set of normally closed relay contacts B1 and deenergize the relay coils C and D. In addition, the opening of the contact 60A deenergizes the relay coil A to maintain the motor 18 of FIG. 1 energized.

As the tracking member 50 is moved down the track 52, the output of the encoder 41 of the base member 34 and the output of the encoder 94 in the workpiece carrier position indicator 44 are subtracted by the difference detector 43 which provides to the programmed controller 42 a signal which represents the position of the base member 34 relative to the workpiece carrier 12. Using this signal the programmed controller 42 is first taught the series of points at which the base member 34 is to be moved to enable the work tool 26 to perform the desired operations on the workpiece during programmed operation. Thereafter using this signal, the base member 34 is positioned, in response to the programmed instructions, along the support 36 so that the work tool 26 can perform programmed operations at precise locations on a moving workpiece as if the workpiece were stationary. As previously indicated, the velocity of the base member 34 when being moved between the programmed points is independent from and substantially greater than the velocity of the workpiece.

When the workpiece carrier 12 has moved the tracking member 50 to the end of the work station, the cam follower 117 engages the cam 118. The holding member 98 is rotated thereby to release the lock lever 54 which moves to its lowered position and out of engagement with the gate lock 68 of the workpiece carrier 12. As the holding member 98 is rotated, the actuating member 128 attached thereto actuates the limit switch 120 to close the set of normally open contacts 120A and energize the solenoid winding 144. The energization of the solenoid winding 144 moves the air valve controlling the air input to the air motor 86 to supply air thereto. The air motor 86 is thereby energized to rotate the sprocket 84 to return the tracking member 50 to its home position. The tracking member 50 is then in position for the advancement of another workpiece carrier into the work station.

Figure 6:
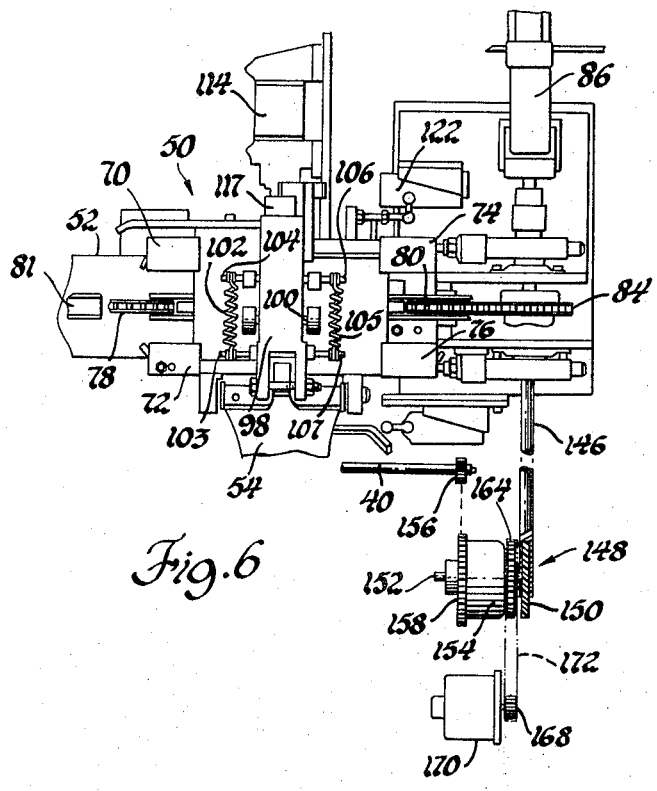
FIG. 6 is a schematic drawing of another embodiment of the position compensator.
Figure 7:
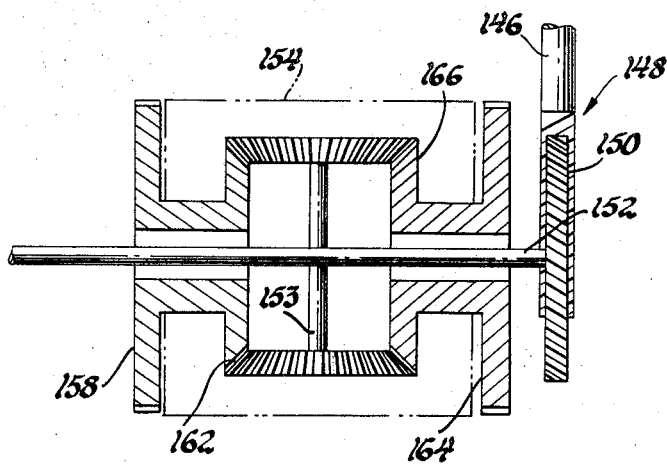
FIG. 7 is a schematic drawing of the differential portion of the embodiment shown in FIG. 6.

Referring to FIGS. 6 and 7, there is shown another embodiment of the present invention. Instead of driving the encoder 94, the sprocket 84 rotates an output shaft 146 which terminates in a worm gear assembly 148. The wheel portion 150 of the worm gear assembly is rigidly attached to an input shaft 152 which engages the pinion carrier 153 of a differential 154. Also, in this embodiment, the screw 40, which is rotated by the motor 38 of FIG. 1, does not drive the encoder 41 but instead rotates a gear 156 which engages and drives a gear 158. The gear 158 is attached to the side gear 162 of the differential 154 for rotation therewith. A sprocket 164 is attached to a side gear 166 of the differential 154 for rotation therewith, and drives a sprocket 168, which is attached to the input shaft of an encoder 170, by means of a chain 172. The output of the encoder 170 is an electrical signal which is supplied to the programmed controller of FIG. 1, the difference detector 43 of FIG. 1 being eliminated.

As the base member 34 of FIG. 1 is moved by the screw 40, the gear 158 and the attached side gear 162 are rotated by the screw 40 to a position directly related to the position of the base member 34 along the support 36.

As the tracking member 50 is moved down the track 52 by a workpiece carrier 12, the sprocket 84 rotates the shaft 146 to rotate the sprocket 150 and the attached input shaft 152 to a position directly related to the position of the workpiece carrier 12.

By the nature of the differential 154, the side gear 166 and the attached sprocket 164 are rotated to a position which represents the difference between the rotations of the side gear 162 and the input shaft 152. Consequently, the input shaft of the encoder 170 is rotated to generate a signal which represents the difference between the two input rotations from the screw 40 and the sprocket 146 which difference also represents the position of the base member 34 with respect to the workpiece carrier 12. As will be noted, this is the same signal supplied by the difference detector 43 in the embodiment previously described.

The detailed descriptions of the preferred embodiments of the invention for the purpose of explaining the principles thereof is not to be considered as limiting of restricing the invention, since many modifications may be made by the exercise of skill in the art without departing from the scope of the invention.

We claim:

1. An apparatus for performing programmed operations on a workpiece mounted on a carrier movable along a first track between an entrance point and an exit point of a work station, comprising a work device supported on a base movable in either direction along a second track adjacent and parallel to the first track of the workpiece carrier, means for driving the workpiece carrier along the first track at a substantially constant velocity, means for driving the base along the second track relative to the workpiece carrier so as to allow the work device to perform operations on any portion of the workpiece as the latter is conveyed by the workpiece carrier, a programmed servocontrol system for operating the work device and the base drive means for positioning the base at different programmed points relative to the workpiece carrier so that the work device can perform programmed operations on the workpiece, first position responsive means adapted to be connected to the workpiece carrier, said first position responsive means comprising a tracking device; a third track supporting the tracking device for movement along the first track between the entrance point and the exit point of the work station, the tracking device being initially positioned at the entrance point of the work station and having a first member attached thereto; means supporting the first member on the tracking device for shifting movement between first and second positions; a second member attached to the workpiece carrier at a predetermined point thereon; actuating means for shifting the first member from its first position to its second position when the second member is at the entrance point of the work station so as to mechanically couple the tracking device to the workpiece carrier and thereby cause the tracking device to be driven by the workpiece carrier; means for shifting the first member from its second position to its first position so as to decouple the tracking device from the workpiece carrier when the tracking device reaches the exit point of the work station; drive means for returning the tracking device to the entrance point of the work station after the first member is shifted from its second position to its first position; and indicating means coupled to the tracking device and responsive to the movement thereof for generating an output directly proportional to the position of the tracking device between the entrance point and the exit point of the work station so as to provide an indication of the position of the workpiece carrier between the entrance point and the exit point, second position responsive means connected to the base and responsive to the movement thereof for generating an output directly related to the position of the base along said second track, and means connected to the first and second position responsive means and the programmed servo control system and responsive to the outputs of the first and second position responsive means for supplying to the programmed servo control system a signal directly related to the position of the base relative to the position of the workpiece carrier so that the programmed servo control system operates the base drive means in programmed sequence for positioning the base at various points relative to the moving workpiece carrier so that the work device performs its operations on the workpiece as if the latter were in a precisely fixed and stationary position.

2. An apparatus for performing programmed operations on a workpiece mounted on a carrier movable along a first track between an entrance point and an exit point of a work station, comprising a work device supported on a base movable in either direction along a second track adjacent and parallel to the first track of the workpiece carrier, means for driving the workpiece carrier along the first track at a substantially constant velocity, means for driving the base along the second track relative to the workpiece carrier so as to allow the work device to perform operations on any portion of the workpiece as the latter is conveyed by the workpiece carrier, a programmed servo control system for operating the work device and the base drive means for positioning the base at different programmed points relative to the workpiece carrier so that the work device can perform programmed operations on the workpiece, first position responsive means adapted to be connected to the workpiece carrier, said first position responsive means comprising a tracking device; a third track supporting the tracking device for movement along the first track between the entrance point and the exit point of the work station, the tracking device being initially positioned at the entrance point of the work station and having a lock lever attached thereto; means supporting the lock lever on the tracking device for pivotal movement between lowered and raised positions; reciprocable means for moving the lock lever from its lowered position to its raised position; a substantially U-shaped lock lever receiver mounted on the workpiece carrier and having a pair of arms horizontally extending therefrom; actuating means responsive to the position of the workpiece carrier for activating the reciprocable means when the lock lever receiver is at the entrance point of the work station, whereby the lock lever is pivoted from its lowered position to its raised position between the arms of the lock lever receiver to thereby lock the tracking device to the workpiece carrier so as to permit the latter to drive the tracking device along the first track between the entrance point and exit point of the work station; release means for pivoting the lock lever from its raised position to its lowered position and out of engagement with the lock lever receiver, said release means including a cam follower supported on the tracking device and cooperating with a cam means mounted adjacent the track at the exit point of the work station in the line of movement of the cam follower as the workpiece carrier is moved to the exit point of the work station; drive means for returning the tracking device to the entrance point of the work station after the lock lever is shifted to its lowered position; and indicating means coupled to the tracking device and responsive to the movement thereof for generating an output directly proportional to the position of the tracking device between the entrance point and the exit point of the work station so as to provide an indication of the position of the workpiece carrier between the entrance point and the exit point, second position responsive means connected to the base and responsive to the movement thereof for generating an output signal directly related to the position of the base on the second track and circuit means connected to the first and second position responsive means and the programmed servo control system and responsive to the output signals of the first and second position responsive means for supplying to the programmed servo control system a signal directly related to the position of the base relative to the position of the workpiece carrier so that the programmed servo control system operates the base drive means in programmed sequence for positioning the base at various points relative to the moving workpiece carrier so that the work device performs its operations on the workpiece as if the latter were in a precisely fixed and stationary position.

3. An apparatus for continuously providing an indication of the position of a workpiece carrier as it is driven by a motor along a path between an entrance point and exit point of a work station, comprising a tracking device; a track supporting the tracking device for movement along the path between the entrance point and exit point of the work station, the tracking device being initially positioned at the entrance point of the work station and having a first member attached thereto; means supporting the first member on the tracking device for shifting movement between first and second positions; first switch means responsive to the position of the tracking device for generating an output signal when the tracking device is at the entrance point of the work station; second switch means responsive to the position of the first member for generating an output signal when the first member is in its first position; third switch means responsive to the position of the workpiece carrier for generating an output signal when the workpiece carrier is at a predetermined distance before entry into the work station; gate means connected to the first, second and third switch means and the workpiece carrier motor and responsive to the output signals of the first, second and third switch means for deenergizing the motor so as to stop the movement of the workpiece carrier when the workpiece carrier is at the predetermined distance before entry into the work station and the tracking device is not at the entrance point and the second member is not in its first position; a second member attached to the workpiece carrier at a predetermined point thereon; actuating means for shifting the first member from its first position to its second position when the second member is at the entrance point of the work station so as to couple the tracking device to the workpiece carrier and thereby cause the tracking device to be driven by the workpiece carrier; means for shifting the first member from its second position to its first position so as to decouple the tracking device from the workpiece carrier when the tracking device reaches the exit point of the work station; drive means for returning the tracking device to the entrance point of the work station after the first member is shifted from its second position to its first position; and indicating means coupled to the tracking device and responsive to the movement thereof for generating an output directly proportional to the position of the tracking device between the entrance point and the exit point of the work station so as to provide an indication of the position of the workpiece carrier between the entrance point and the exit point.

4. A position compensator for a program controlled work device controlled by a programmed controller for indicating the relative positions of the work device which is mounted on a base that is movable in either direction along a first track between an entrance point and exit point of a work station and a workpiece which is mounted on a carrier and movable along a second track through the work station adjacent and parallel to the first track comprising means for driving the workpiece carrier along the second track; drive means connected to the programmed controller and responsive thereto for driving the base to different positions relative to the workpiece carrier so as to allow the work device to perform programmed operations on any portion of the workpiece as the latter is conveyed by the workpiece carrier; a tracking device; a third track supporting the tracking device for movement adjacent the second track between the entrance point and the exit point of the work station, the tracking device being initially positioned at the entrance point of the work station; coupling means connected to the tracking device and responsive to the position of the workpiece carrier for coupling the tracking device to the workpiece carrier when the latter is at the entrance point of the work station to thereby cause the tracking device to be driven by the workpiece carrier; first indicating means coupled to the tracking device and responsive to the movement thereof for generating an output directly proportional to the position of the tracking device between the entrance point and the exit point of the work station; second indicating means responsive to the movement of the base between the entrance point and the exit point of the work station for generating an output directly proportional to the position of the work device between the entrance point and exit point of a work station, and means connected to the first and second indicating means and to the programmed controller and responsive to the outputs of the first and second indicating means for supplying to the programmed controller a signal directly proportional to the difference between the first and second signals, the output signal also being directly proportional to the position of the work device relative to the workpiece.

5. An apparatus for continuously providing an indication of the position of a workpiece carrier as it is driven along a path between an entrance point and exit point of a work station, comprising a tracking device; a track supporting the tracking device for movement along the path between the entrance point and the exit point of the work station, the tracking device being initially positioned at the entrance point of the work station and having a first member attached thereto; means supporting the first member on the tracking device for shifting movement about a horizontal axis between first and second positions; a second member attached to the workpiece carrier at a predetermined point thereon; actuating means including a plunger for shifting the first member from its first position to its second position when the second member is at the entrance point of the work station so as to couple the tracking device to the workpiece carrier and thereby cause the tracking device to be driven by the workpiece carrier; cam means for shifting the first member from its second position to its first position so as to decouple the tracking device from the workpiece carrier when the tracking device reaches the exit point of the work station; motor means for returning the tracking device to the entrance point of the work station after the first member is shifted from its second position to its first position; and indicating means coupled to the tracking device and responsive to the movement thereof for generating an output directly proportional to the position of the tracking device between the entrance point and the exit point of the work station so as to provide an indication of the position of the workpiece carrier between the entrance point and the exit point.

6. An apparatus for continuously providing an indication of the position of a workpiece carrier as it is driven along a path between an entrance point and exit point of a work station comprising a tracking device; a track supporting the tracking device for movement along the path between the entrance point and the exit point of the work station, the tracking device being initially positioned at the entrance point of the work station and having a lock lever attached thereto; a cam follower supported by one end of said lock lever, means including a spring supporting the lock lever on the tracking device for pivotal movement about a horizontal axis between lowered and raised positions; reciprocable means for moving the lock lever from its lowered position to its raised position; a lock lever receiver mounted on the workpiece carrier, actuating means responsive to the position of the workpiece carrier for activating the reciprocable means when the lock lever receiver is at the entrance point of the work station, whereby the lock lever is pivoted from its lowered position to its raised position between the arms of the lock lever receiver to thereby lock the tracking device to the workpiece carrier so as to permit the latter to drive the tracking device along the path between the entrance point and exit point of the work station; release means for pivoting the lock lever from its raised position to its lowered position and out of engagement with the lock lever receiver, said release means including cam means mounted adjacent the track at the exit point of the work station in the line of movement of the cam follower and cooperating with the cam follower for pivoting the lock lever to its lowered position as the workpiece carrier is moved to the exit point of the work station; drive means for returning the tracking device to the entrance point of the work station after the lock lever is shifted to its lowered position; and indicating means coupled to the tracking device and responsive to the movement thereof for generating an output directly proportional to the position of the tracking device between the entrance point and the exit point of the work station so as to provide an indication of the position of the workpiece carrier between the entrance point and the exit point.

7. An apparatus for performing programmed operations on a workpiece mounted on a carrier movable along a first track between an entrance point and an exit of a work station, comprising a work device supported on a base movable in either direction along a second track adjacent and parallel to the first track of the workpiece carrier, means for driving the workpiece carrier along the first track at a substantially constant velocity, means for driving the base along the second track relative to the workpiece carrier so as to allow the work device to perform operations on any portion of the workpiece as the latter is conveyed by the workpiece carrier, a programmed servo control system for operating the work device and the base drive means for positioning the base at different programmed points relative to the workpiece carrier so that the work device can perform programmed operations on the workpiece, first position responsive means adapted to be connected to the workpiece carrier, said first position responsive means comprising a tracking device spaced from the base and supported for movement along the first track between the entrance point and the exit point of the work station, the tracking device being initially positioned at the entrance point of the work station and having a first member for movement between first and second positions; a second member attached to the workpiece carrier at a predetermined point thereon, means for moving the first member from its first position to its second position when the second member is at the entrance point of the work station so as to mechanically couple the tracking device to the workpiece carrier and thereby cause the tracking device to be carried by the workpiece carrier along the first track, means for moving the first member from its second position to its first position so as to decouple the tracking device from the workpiece carrier when the tracking device reaches the exit point of the work station; means for returning the tracking device to the entrance point of the work station after the first member is moved from its second position to its first position; indicating means coupled to the tracking device and responsive to the movement thereof for generating an output directly proportional to the position of the tracking device between the entrance point and the exit point of the work station so as to provide an indication of the position of the workpiece carrier between the entrance point and the exit point, second position responsive means connected to the base and responsive to the movement thereof for generating an output directly related to the position of the base along said second track, and means connected to the first and second position responsive means and the programmed servo control system and responsive to the outputs of the first and second position responsive means for supplying to the programmed servo control system a signal directly related to the position of the base relative to the position of the workpiece carrier so that the programmed servo control system operates the base drive means in programmed sequence for positioning the base at various points relative to the moving workpiece carrier so that the work device performs its operations on the workpiece as if the latter were in a precisely fixed and stationary position.

* * * * *